(12) United States Patent
Hadderman et al.

(10) Patent No.: US 8,909,383 B2
(45) Date of Patent: Dec. 9, 2014

(54) PROACTIVE COOLING OF CHIPS USING WORKLOAD INFORMATION AND CONTROLS

(75) Inventors: Scott J. Hadderman, Pleasant Valley, NY (US); Daniel J. Kearney, Ulster Park, NY (US); Wei Huang, Austin, TX (US); K. Paul Muller, Wappingers Falls, NY (US); William J. Rooney, Hopewell Junction, NY (US); Guillermo J. Silva, Austin, TX (US); Malcolm S. Ware, Austin, TX (US); Emmanuel Yashchin, Yorktown Heights, NY (US); Peter B. Yocom, Lagrangeville, NY (US)

(73) Assignee: International Business Machines Corporation, Armonk, NY (US)

( * ) Notice: Subject to any disclaimer, the term of this patent is extended or adjusted under 35 U.S.C. 154(b) by 441 days.

(21) Appl. No.: 13/334,903

(22) Filed: Dec. 22, 2011

(65) Prior Publication Data

US 2013/0166095 A1 Jun. 27, 2013

(51) Int. Cl.
*G05D 23/00* (2006.01)
*G01K 7/00* (2006.01)
*H01L 35/00* (2006.01)
*H01L 37/00* (2006.01)
*H03K 3/42* (2006.01)
*H03K 17/78* (2006.01)

(52) U.S. Cl.
USPC ........... 700/299; 700/300; 374/166; 374/178; 327/512; 327/513

(58) Field of Classification Search
USPC ........... 700/299, 300; 374/166, 178; 327/512, 327/513
See application file for complete search history.

(56) References Cited

U.S. PATENT DOCUMENTS

| 6,198,245 | B1 | 3/2001 | Du et al. | |
|---|---|---|---|---|
| 6,676,026 | B1 | 1/2004 | McKinley et al. | |
| 7,068,093 | B2 | 6/2006 | Morishita et al. | |
| 7,347,621 | B2 * | 3/2008 | Sri-Jayantha et al. | 374/166 |
| 7,373,268 | B1 | 5/2008 | Viredaz et al. | |
| 7,724,149 | B2 | 5/2010 | Kettler, III et al. | |
| 2007/0001697 | A1 | 1/2007 | Dobberpuhl et al. | |
| 2007/0225871 | A1 | 9/2007 | Karstens | |
| 2008/0059111 | A1 * | 3/2008 | Sri-Jayantha et al. | 702/132 |
| 2008/0236175 | A1 | 10/2008 | Chaparro Monferrer et al. | |
| 2009/0048808 | A1 * | 2/2009 | Bose et al. | 702/186 |
| 2009/0295458 | A1 | 12/2009 | Kameyama et al. | |
| 2009/0316750 | A1 | 12/2009 | Sheng et al. | |
| 2010/0324739 | A1 | 12/2010 | Dawson et al. | |
| 2011/0035078 | A1 | 2/2011 | Jackson | |
| 2011/0205888 | A1 | 8/2011 | Laitinen et al. | |

* cited by examiner

*Primary Examiner* — Ronald Hartman, Jr.
(74) *Attorney, Agent, or Firm* — Jason H. Sosa; Dennis W. Jung; Margaret Pepper

(57) ABSTRACT

A method to reduce large temperature over/undershoot in a computer system. Using workload data, the method proactively modifies controls of mechanical cooling system to anticipate power and take appropriate actions to maintain temperature. Workload control modifies workload and scheduling to reduce power transients and subsequent temperature deviations. In addition, workload control allows more even distribution of temp across chips, allowing for even wear and reduction of small/ripple/noise temp oscillations. A system and program product for carrying out the method are also provided.

15 Claims, 6 Drawing Sheets

PROACTIVE COOLING OF CHIPS USING WORKLOAD INFORMATION AND CONTROLS

BACKGROUND OF THE INVENTION

1. Field of the Invention

This invention relates, in general, to computer system cooling, and in particular, to proactive cooling of computer chips.

2. Description of the Related Art

During normal operation, microelectronic chips generate heat. This heat is typically removed via a cooling system, enlisting various methods including metal heat sinks, fans, and mechanical refrigeration. As microelectronic chips execute tasks with varying levels of workload, the chips create commensurate changes in heat. To avoid under or over cooling, current cooling systems rely on temperature measurements that lag the change in power as feedback in order to regulate cooling. For example, a chip experiences an increase in workload. This workload increase creates an increase in power consumption. This increase in power consumption results in a temperature increase to the chip. The cooling system detects this temperature change and reacts by increasing cooling. The increased cooling returns the microelectronic chip back to its original temperature. In addition, on chip control techniques have been developed to regulate chip temperatures by regulating voltage, as described in On-Chip Control of Thermal Cycling, U.S. patent Ser. No. 13/040,094, which is hereby incorporated by reference.

Unfortunately, as the cooling system is reacting to the temperature, the microelectronic chip experiences an increase and then decrease in temperature. Even in the best systems, this thermal cycling is a significant result of the heat-temperature-feedback control. As microelectronic chip technology advances, the temperature extremes, as well as cycling rates, of this cycling will increase. The problem arises in that this cycling reduces package and silicon reliability and forces designers to build in temperature buffer that can reduce microelectronic chip performance. Also, this cycling can degrade cooling system effectiveness and significantly reduce cooling lifetime.

SUMMARY OF THE INVENTION

According to an aspect of the invention, a method for maintaining stable temperatures of microelectronic chips is provided. The method includes: monitoring, by a computer processor, incoming workload data to a microelectronic chip; creating a profile based on the incoming workload data; analyzing the workload data to forecast changes in power associated with the chip processing an upcoming workload; and in response to a forecasted change in power associated with the chip, implementing control measures.

According to another aspect of the invention, a computer program product maintaining stable temperatures of microelectronic chips is provided. The computer program product includes: a non-transient computer readable storage medium having computer readable program code embodied therewith, the computer readable program code configured to carry out the steps of a method. The method includes: monitoring, by a computer processor, incoming workload data to a microelectronic chip; creating a profile based on the incoming workload data; analyzing the workload data to forecast changes in power associated with the chip processing an upcoming workload; and in response to a forecasted change in power associated with the chip, implementing control measures.

According to yet another aspect of the invention, a system to maintain stable temperatures of microelectronic chips, is provided. The system includes: a memory; and a processor configured to communicate with the memory, wherein the computer system is configured to perform a method. The method includes: monitoring, by a computer processor, incoming workload data to a microelectronic chip; creating a profile based on the incoming workload data; analyzing the workload data to forecast changes in power associated with the chip processing an upcoming workload; and in response to a forecasted change in power associated with the chip, implementing control measures.

Unlike typical feedback controllers, this controller makes use of the workload to calculate the future heat change and therefore can more accurately and predicatively adjust the cooling unit.

DETAILED DESCRIPTION OF THE PREFERRED EMBODIMENTS

Figure 1:
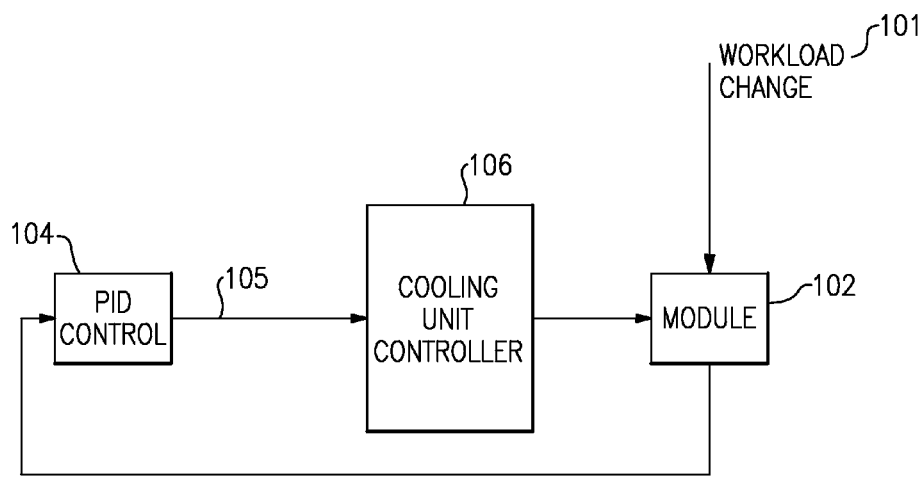
FIG. 1. depicts a flowchart for cooling computer chips

In current computing environments, microelectronic chips experience significant thermal cycling as the rate and extremes of cycling increase due to chips handling more intense workload. Workloads have phases with different power consumption. Currently, macro thermal cycles at the Multi Chip Module (MCM) level are managed over seconds and wide variation of temperatures. These macro thermal cycles are initiated by significant changes in workload—such as would occur when a new thread is initiated on a core in the processer. In some popular logic technologies, as the core changes from an idle state to an execution state, it will consume electrical current and will generate a corresponding increase in heat. This heat will be shed through the cooling mechanics of the MCM and will lead to increasing temperature. This temperature increase will be sensed and the cooling system will react in an attempt to maintain an envelope of operating temperature. Periodic readings of MCM at temperature sensors (100s of milliseconds timescale) are employed and feedback driven algorithms adjust cooling system valve positions for liquid cooling to maintain the operating envelope. Some limitations of utilizing such management are that large changes in power due to workload will drive significant macro under/overshoot temperature cycles and during instances of stable power, the cooling system needs to continually adjust in response to small fluctuations in temperature resulting in micro temperature cycles. Trade-offs between transient response time and noise filtering are required.

Power management techniques such as DVFS Dynamic Voltage Frequency Slewing (DVFS) in which voltage and frequency are adjusted during operation to control power, and clock-gating lead to higher power swings and hence more severe and frequent thermal cycles. In addition, recent processors have Turbo modes which have significantly higher local temperature swings. Thermal cycling reduces package and silicon reliability, resulting in a reduction in the lifetime of a system. Examples of issues encountered due to thermal cycling include Back-end-of-line (BEOL) metal/dielectrics delamination, C4 fatigue, and underfill glassification. In addition, more recent lead-free and organic packages are more prone to thermal cycle failures. As a result of non-ideal silicon technology scaling, microelectronic chips can experience higher peak temperature and power density increases as high temperature excursions resulting in performance loss and reliability degradation.

In addition, circuit timing may change with temperature. Failure mechanisms such as electromigration, hot carrier injection, and Negative Bias Temperature Instability (NBTI) are strongly temperature dependent. A lack of precise temperature control requires increased safety margins and, thus, a reduction in maximum clock frequencies thereby reducing performance.

Techniques such as thermal cycling can also reduce the reliability of cooling subsystems, which are subject to mechanical wear and break down. In addition, increased temperature oscillation frequency and increased temperature min-to-max extremes adversely impact compressors and control valves.

Correlations between shock, vibrations, and/or oscillations and reduced machinery reliability are known in the art. Additional issues with other measures to control temperature include the possibility of overcooling, which can result in destructive condensation and additional expense, since extra, unnecessary cooling capacity may be designed and implemented.

As shown in FIG. 1, large thermal time constant creates a constant game of catch-up as the mechanical cooling is always trying to catch-up to a fast moving thermal target created by a chip. The target is based on temperature, which itself, is a lagging measurement. FIG. 1 depicts a work load change 101. This change causes the chip to execute either a different set of instructions or execute instructions at a faster or slower rate. This change in execution will result in an increase or reduction in heat generation by the chip executing these instructions. This heat is shed to the module 102 that contains the chip and will be sensed as a change in temperature. The change in instruction and/or execution occurs over a few hundred nanoseconds. The resultant change in heat occurs over a few micro-seconds and the change in temperature at the sensor occurs on the order of milli-seconds.

Next, feedback controller 104, which in this embodiment is a proportion-integral-derivative (PID) feedback controller, detects the change in temperature feedback and calculates a reactive control change 105. This control change is forwarded to the cooling unit controller 106 to adjust cooling capacity by reducing or increasing cooling depending on the associated rise or fall of sensed temperature.

The result of this mechanical to electrical time constant mismatch is that the mechanical unit continually over/undershoots and the chip temperature continually oscillates above and below desired objectives in reaction to workload changes. The change in cooling will cause a subsequent change in the resultant temperature. However, since the PID controller is reactive, the cycle will tend to overshoot, i.e. this adjustment is made strictly on the bases of temperature/time constants with no knowledge of the actual change in workload. The controller will re-adjust the cooling in reaction to this overshoot. Due to this overshoot and subsequent corrective reactions, the PID controller typically creates a series of dampened oscillations in response to a workload change. These oscillations will eventually dampen until the system reaches equilibrium. Unfortunately, every workload change will create these dampened oscillations.

Other monitors in addition to temperature may provide an effective means to control mechanical cooling. These monitors can originate from code designed to analyze incoming workload to predict instruction streams and consequently predict a chip's power requirements, compensating for time constant differences and allows for tighter control of temperature. This may help achieve precise thermal control of microelectronic chips to improve reliability and performance, thereby providing higher reliability and availability for a cooling subsystem.

In an embodiment of the invention a synergy of feedback driven mechanisms combined with proactive information to adjust feedback driven set points is provided. These feedback mechanisms work on short (micro) and long (macro) time scales based on the available measurement and actuation mechanisms. Proactive information comes from workload managers with scheduling knowledge prior to starting or ending work.

Unlike typical feedback controllers, this controller makes use of the workload to calculate the future heat change and therefore can more accurately and predicatively adjust the cooling unit.

Figure 2:
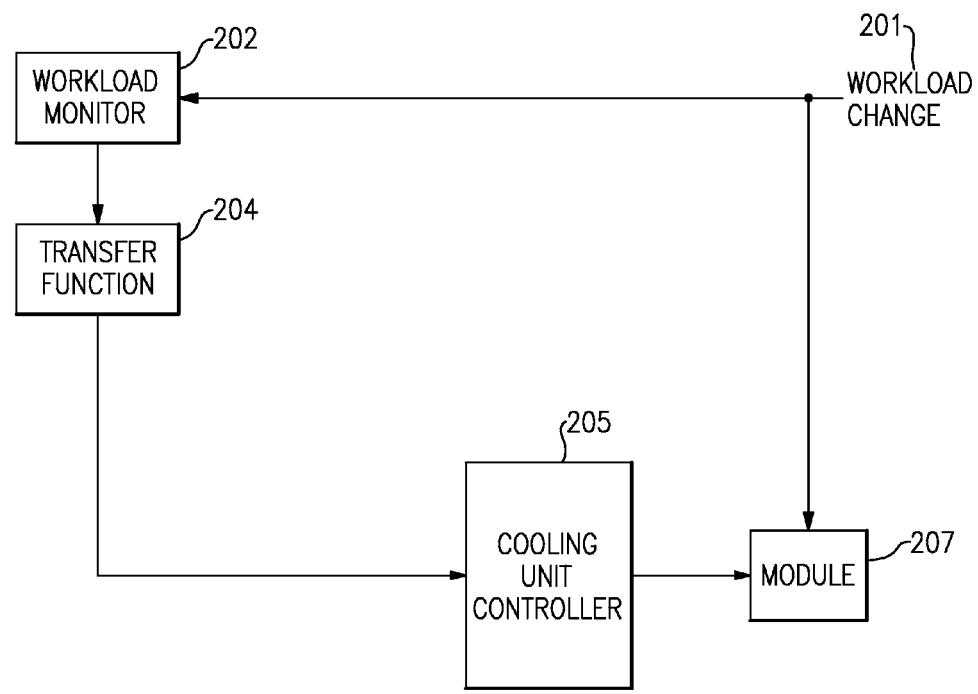
FIG. 2. depicts a high level diagram of an embodiment of the invention

FIG. 2 displays an application of proactive control. Workload Change 201 is monitored by Work Load Monitor 202. Workload Monitor 202 then causes a cooling change based on the workload change to cause a chip temperature change. Work Load Monitor 202 causes a cooling change based on the Work Load Change 201 without having to wait for a chip temperature change as depicted in FIG. 1.

Workload change 201 causes the chip to execute either a different set of instructions or execute instructions at a faster or slower rate. This change in execution will result in an increase or reduction in heat in the chip executing these instructions. Concurrent to the workload change, workload monitor 202 detects the change in workload, by, for example, sensing a rate and/or type of instructions being executed such as a Delta of instructions per second or a difference of instruction types such as memory fetches versus internal cycles. This monitor then forwards a metric of workload to be converted to a predictive calculated heat measurement in Step 204. In step 204, a transfer function takes as input Workload Monitor data to determine a measurement of an appropriate cooling response. This measurement is then used by the cooling unit to proactively increase or decrease cooling by Cooling Unit Controller 205. Cooling Controller 205 makes any appropriate adjustments to cooling capacity for Module 207 which contains the chip.

Because cooling capacity is set proactively based upon actual workload, the cooling rate should exactly match the heat load generated by any change in workload. Therefore, temperature should remain nearly constant.

Figure 3:
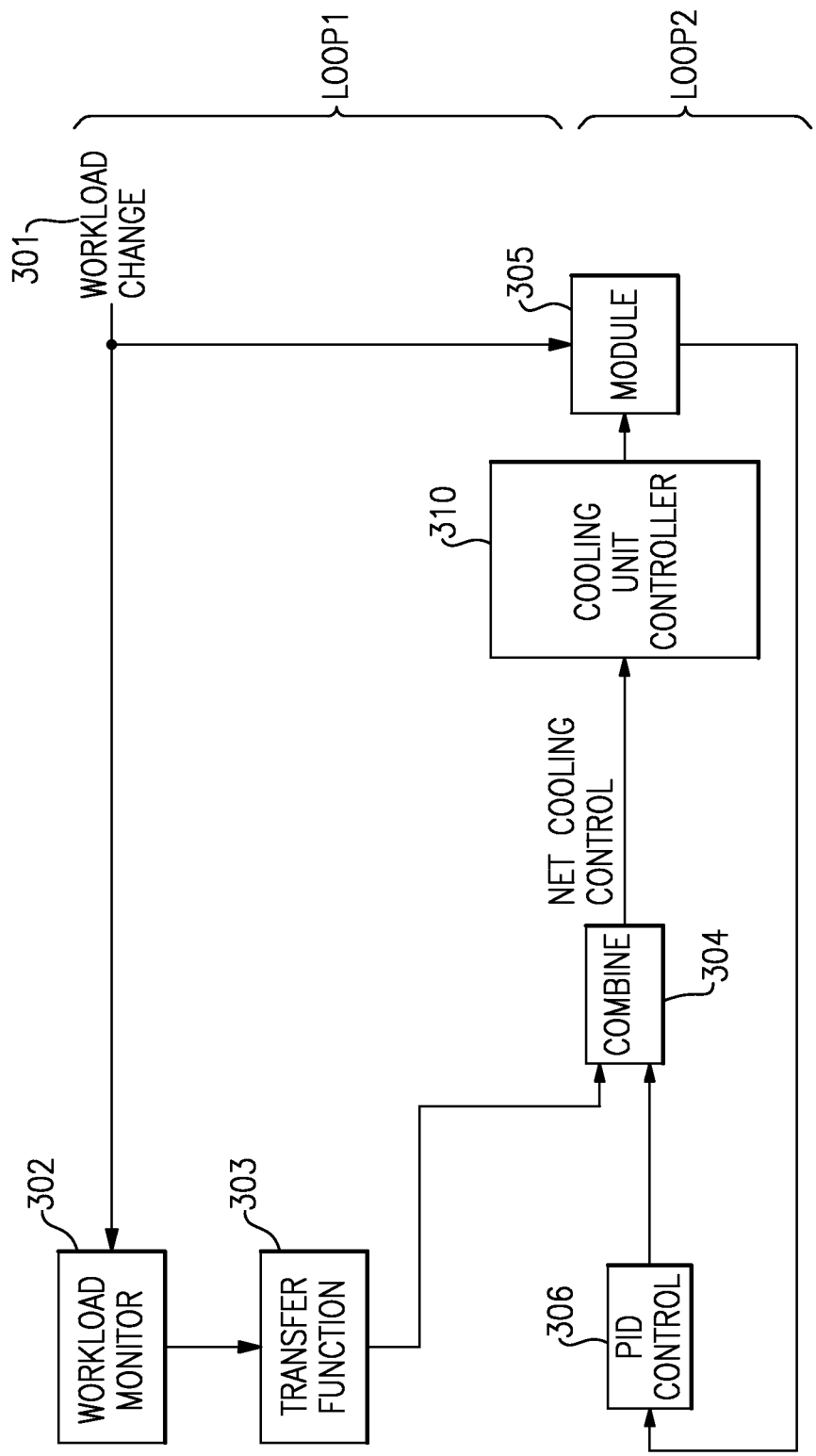
FIG. 3. depicts an embodiment of the invention with a combination controller

The Work Load Monitor may also work in conjunction with a System Dispatcher to dispatch work to CPUs or other chips in an effort to limit the fluctuation of temperature to a subset of all of the chips in a machine. For example, workload fluctuations may be limited to one microprocessor by maintaining an average utilization on a number of chips, and handling the variations by dispatching more or less work on the remaining chips. This reduces the fluctuation of temperature on the "core" set of processors. Workload can then be kept constant but rotated among the set of core processors, so that over the life of the machine, all processor chips have had their utilization/temperature maintained for approximately the same amount of time. Other unlicensed core processors may also be activated to avoid a temperature decrease in response to a forecasted substantial heat load. An automated scheduling product may also be used to regulate the introduction of work into the system to reduce fluctuation in temperature, a rate at which temperature changes, or the range within which temperature fluctuates FIG. 3 represents a proactive control loop integrated with a feedback controller. This diagram represents a proactive control loop integrated with a feedback controller. The innovative feature of this proposal is that the invention can work in concert with existing feedback systems. This allows for retrofitting of existing systems. This also allows for redundancy in the case that one of the systems fails. The diagram consists of two loops—the proactive control loop, Loop 1 in the upper half of the figure, and the traditional feedback controller loop, Loop 2 in the lower half of the figure. Hence a proactive cooling control system can work concurrently with a traditional PID system, providing an integrated backup solution.

The cycle begins with a workload change 301. This change causes the chip to execute either a different set of instructions or execute instructions at a faster/slower rate. This change in execution will result in an increase/reduction in heat in the chip executing these instructions.

In the upper half of the diagram, Loop 1, concurrent to the workload change, a workload monitor 302 detects the change in workload, for example, by sensing a rate and/or type of instructions being executed. In step 303, a Transfer function takes as input the Workload Monitor data to determine a measurement of an appropriate cooling response. This measurement is combined in 304 with data extracted from a more traditional PID feedback system (shown in the lower half of the diagram, Loop 2) to determine a net cooling control response to proactively increase or decrease cooling by Cooling Unit Controller.

Running in parallel with Loop 1 described above, as workload changes in 301, any resultant heat change is shed to the module 305 that contains the chip and will be sensed as a change in temperature. As the temperature changes, the feedback controller, such as a proportion-integral-derivative feedback (PID) controller 306, detects the change in temperature feedback and calculates a reactive cooling control. This information is combined with results from the proactive cooling loop in determining the net cooling control to the cooling unit in step 304.

The combined proactive and feedback data is then forwarded to the cooling unit 310 to either reduce or increase cooling depending on the associated rise or fall of sensed temperature. If the proactive feedback is working properly, there will never be a need for the feedback loop, Loop 2, to provide cooling adjustments and therefore its feedback will be superfluous since predictive cooling should occur and the PID control should not detect any change in module temperature.

Figure 4:
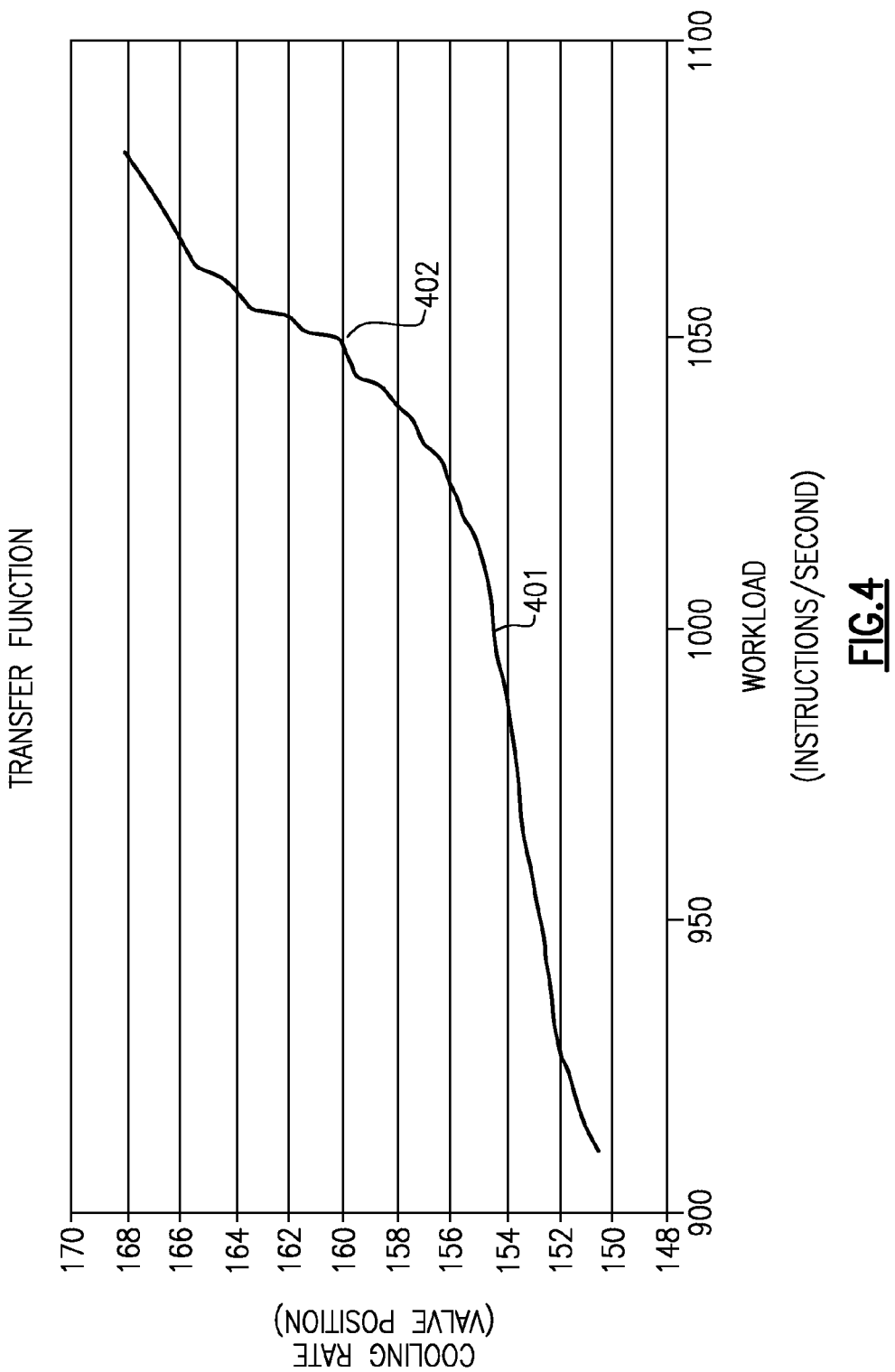
FIG. 4. depicts the Transfer Function

As discussed earlier, the transfer function is used to relate changes in workload to the necessary changes in cooling required to maintain temperature. Referring to the example in FIG. 4, Workload is represented on the x-axis and Cooling rate is represented on the y-axis. For a given workload, for example 1000 instructions/second, a specific cooling rate is necessary to maintain a constant temperature. In the case of 1000 ins/sec the cooling rate would be 154.2 as shown in 401. If the workload were to increase, the curve can be used to recalculate (pro-actively) the proper cooling. If workload increased to 1050 ins/sec then the cooling rate would have to be increased to 160 in order to maintain temperature as shown in 402. Notice that, in this example, the relationship is non-linear and that, as workload increases above approximately 1020 ins/sec, exponentially more cooling is needed to maintain temperature. This transfer function will vary depending on the cooling system and its target electronic cooling chip. Hence the invention can be applied to different cooling and chip technologies.

The key benefit of this invention and the associated transfer function is that this function pro-actively calculates cooling and applies that cooling. Since the cooling matches the change in workload, temperature is constant. In traditional feedback loops, cooling is controlled reactively, after a temperature change is detected. (i.e. any increase in temperature is followed reactively by an increase in cooling and any decrease in temperature is followed reactively by a decrease in cooling.) This reactive controller necessarily results in temperature changes and associated temperature cycles.

Figure 5:
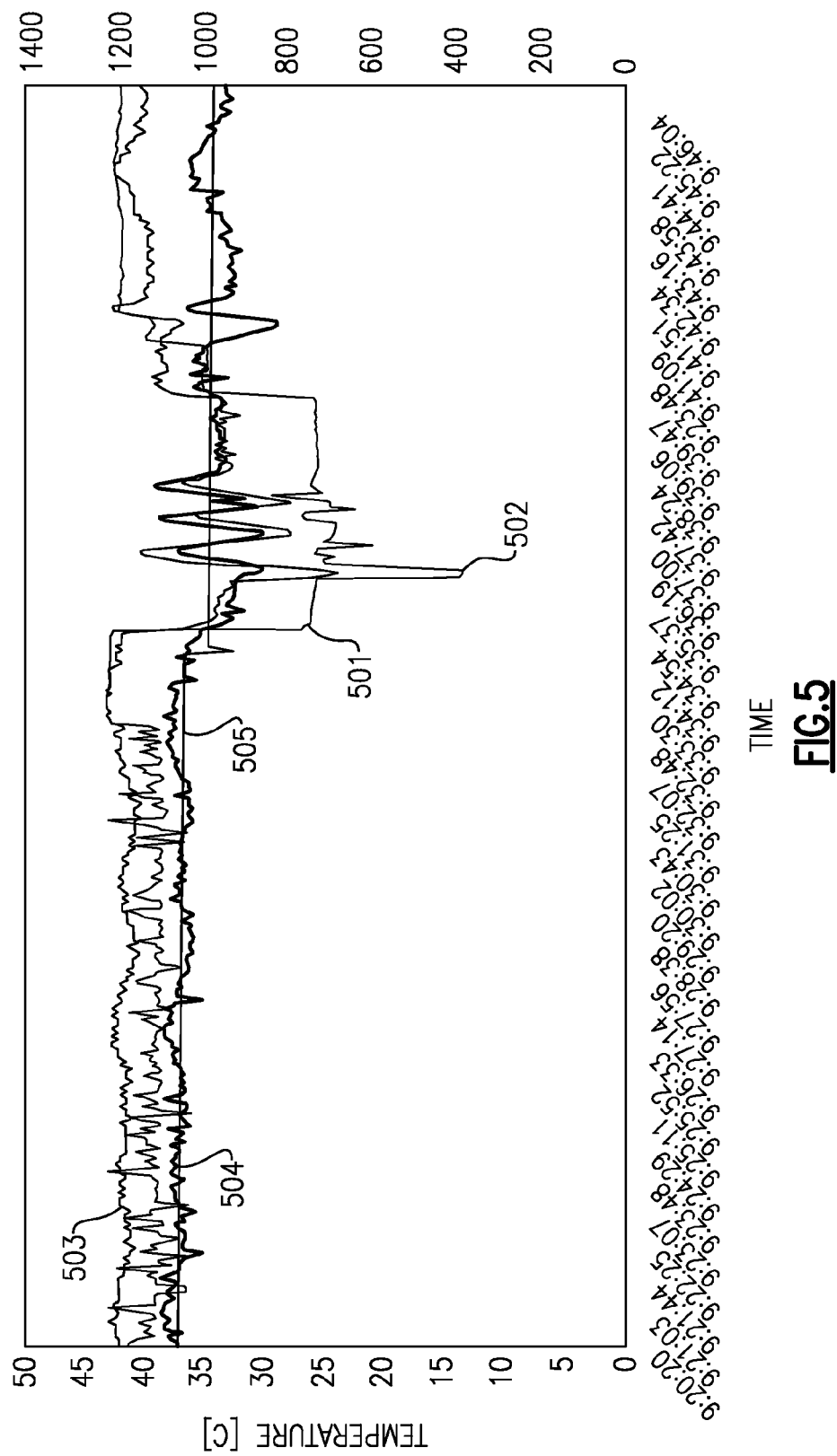
FIG. 5 depicts temperature oscillations associated with a reactive cooling loop

FIG. 5 is an example of potential temperature oscillations associated with a reactive cooling loop. In this example, a sudden power drop occurs at 501 corresponding to time 9:35:37 and at 502 corresponding to time 9:36:19. Temperatures of 3 different chips associated with this power are shown by lines 503, 504 and 505. As the power drops at 502 at time 9:36:19, there is a corresponding drop in chip temperatures. Then, as the reactive cooling unit senses this temperature drops it attempts to correct by reducing cooling. This reduction in cooling leads to an increase in temperature followed by oscillations as the reactive cooling unit continues to over and under cool as it reacts to temperature changes.

Figure 6:
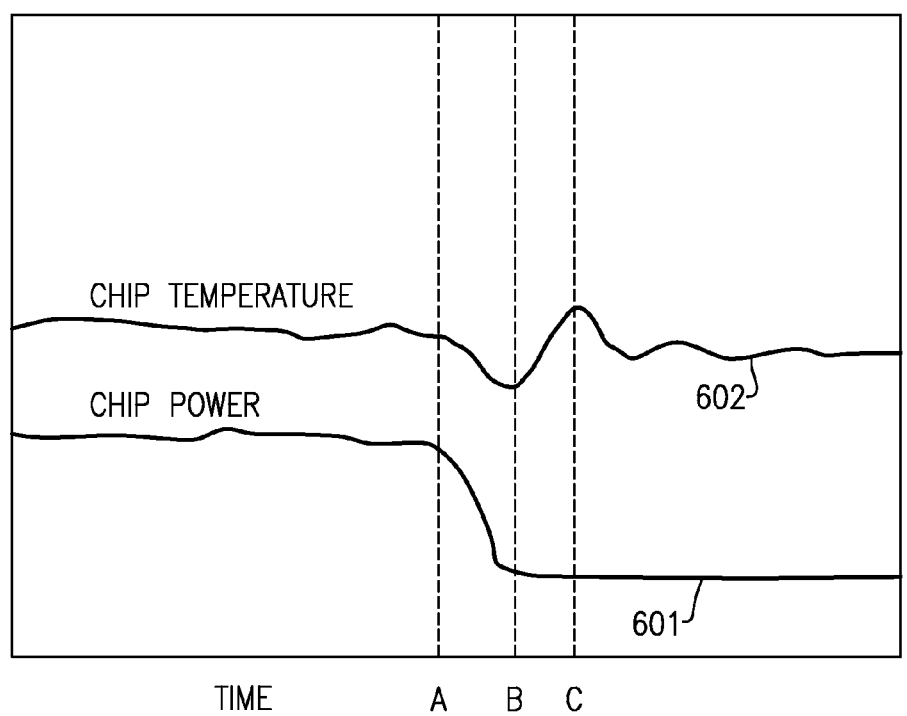
FIG. 6. depicts a Reactive Temperature Control

FIG. 6 shows another example of temperature oscillations that may be associated with a reactive cooling loop. In this case, a sudden power drop occurs at time A as seen on line 601. Chip temperature associated with this power is shown on line 602. Notice that, as the power drops there is a corresponding drop in chip temperature. As the reactive cooling unit senses that temperature has dropped and attempts to correct by reducing cooling. This reduction in cooling leads to an increase in temperature at time B. Temperature increases to the initial value but continues to increase due to the reduced cooling. The reactive cooling unit until now senses an over temperature condition and reacts once more by increasing temperature. This has the desired effect of reducing temperature at time C. Reactive controls (such as PID) attempt to dampen this under/over control and eventually temperature will reach a steady state. However, some degree of oscillation may be difficult to avoid in this reactive control loop since the PID controller is typically tuned for a tradeoff of steady state versus transient response.

Figure 7:
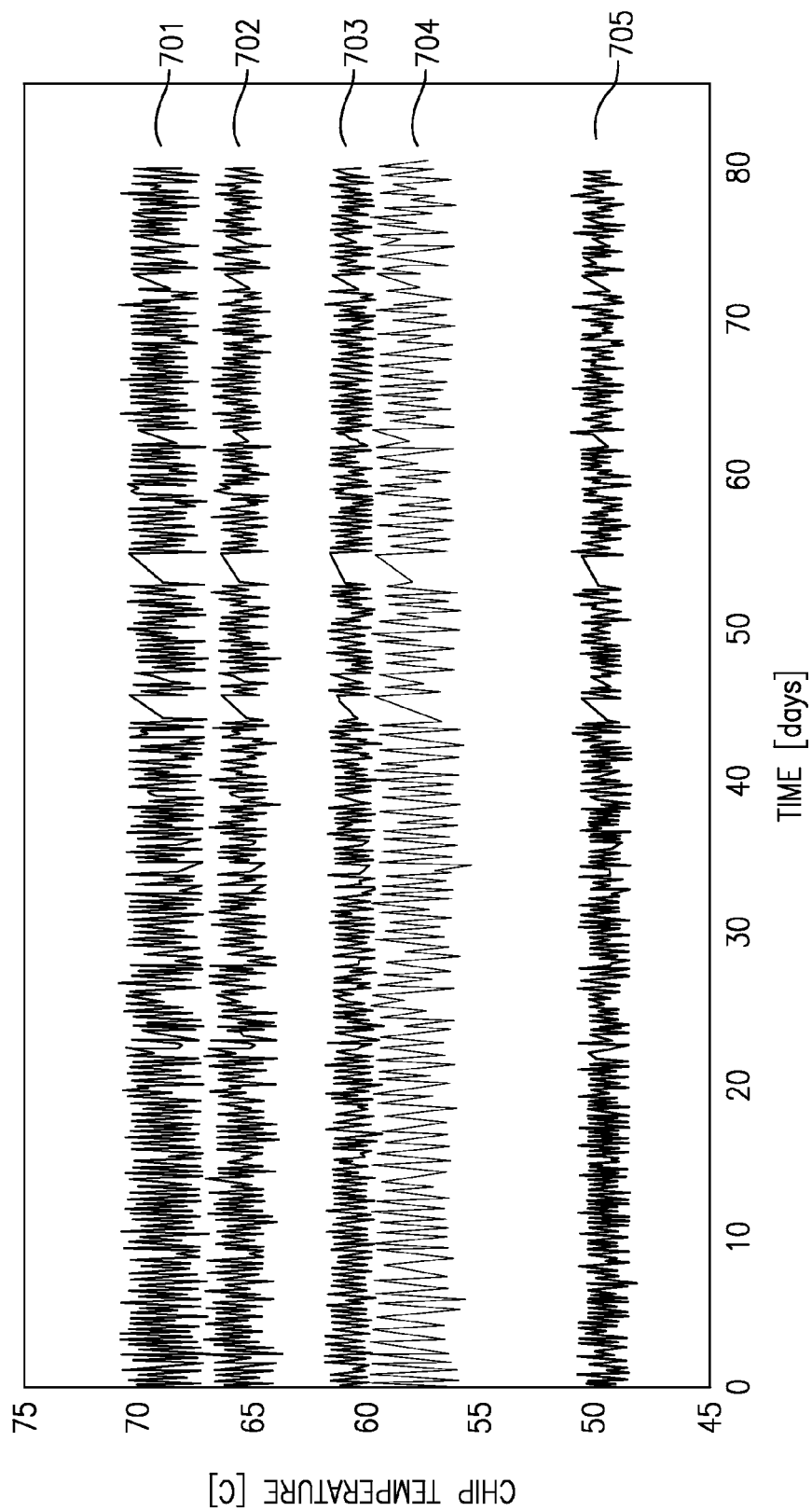
FIG. 7. depicts an example of chip temperature modulation

FIG. 7 is an example of reactive oscillations over a moderate time span and with sample data. Lines 701, 702, 703, 704 and 705 each represent sample reactive oscillations for five separate chips. These cycles can originate from several sources such as major workload changes, minor workload changes, and/or noise in the control system. As can be seen, there can be thousands of oscillations across as much as 5 degrees over an 80 day period. Over extended periods, these oscillations may cause significant wear to the cooling unit as it continually works to maintain temperature and, more importantly, these temperature oscillations can lead to chip damage (through physical fatigue/damage) as the chip expands/contracts with each temperature cycle. Less oscillation amplitude and frequency are paramount to improved chip and system reliability. Some techniques to mitigate these cycles include pro-active cooling to address major cycles due to significant workload and voltage/frequency/utilization modulation cooling to address mini cycles due to minor workload changes and/or noise, feedback delays, etc.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form contain, such as "contains" and "containing") are open-ended linking verbs. As a result, a method or device that "comprises", "has", "includes" or "contains" one or more steps or elements possesses those one or more steps or elements, but is not limited to possessing only those one or more steps or elements. Likewise, a step of a method or an element of a device that "comprises", "has", "includes" or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to explain the principles of the invention and the practical application, and to enable others of ordinary skill in the art to understand the invention through various embodiments and the various modifications thereto which are dependent on the particular use contemplated.

We claim:

1. A method for maintaining stable temperatures of microelectronic chips, the method comprising:
    monitoring, by a computer processor, incoming workload data to a microelectronic chip;
    creating a profile based on the incoming workload data;
    analyzing the workload data to forecast changes in power associated with the chip processing an upcoming workload; and
    in response to a forecasted change in power associated with the chip, implementing control measures, including at least activating unlicensed core processors to avoid a temperature decrease in response to a forecasted substantial heat load decrease.

2. The method of claim 1, wherein implementing control measures further comprises:
    communicating the forecasted changes to a cooling system; and
    changing, by the cooling system, the amount of cooling, in advance of any actual temperature shift to maintain a more constant microelectronic temperature.

3. The method of claim 1, wherein implementing control measures further comprises scheduling the workload of the chip to reduce temperature fluctuation in response to a forecasted substantial heat load increase.

4. The method of claim 1, wherein an automated scheduling product regulates the introduction of work into the system to reduce at least one variable from the group consisting of a fluctuation in temperature, a rate at which temperature changes, or the range within which temperature fluctuates.

5. The method of claim 1 where a system dispatcher dispatches work to CPUs or other chips to limit the fluctuation of temperature to a subset of all of the chips.

6. The method of claim 1 wherein a set of core processors is identified and workload is kept constant and is distributed such that each processor chips has its utilization and temperature maintained for approximately the same amount of time.

7. A method for maintaining stable temperatures of microelectronic chips, the method comprising:
    monitoring, by a computer processor, incoming workload data to a microelectronic chip;
    creating a profile based on the incoming workload data;
    analyzing the workload data to forecast changes in power associated with the chip processing an upcoming workload; and
    in response to a forecasted change in power associated with the chip, implementing control measures,
    wherein a system dispatcher dispatches work to CPUs or other chips to limit the fluctuation of temperature to a subset of all the chips.

8. The method of claim 7, wherein implementing control measures comprises:
    communicating the forecasted changes to a cooling system; and
    changing, by the cooling system, the amount of cooling, in advance of any actual temperature shift to maintain a more constant microelectronic temperature.

9. The method of claim 7, wherein implementing control measures comprises scheduling the workload of the chip to reduce temperature fluctuation in response to a forecasted substantial heat load increase.

10. The method of claim 7, wherein an automated scheduling product regulates the introduction of work into the system to reduce at least one variable from the group consisting of a fluctuation in temperature, a rate at which temperature changes, or the range within which temperature fluctuates.

11. The method of claim 7 wherein a set of core processors is identified and workload is kept constant and is distributed such that each processor chips has its utilization and temperature maintained for approximately the same amount of time.

12. A method for maintaining stable temperatures of microelectronic chips, the method comprising:
    monitoring, by a computer processor, incoming workload data to a microelectronic chip;
    creating a profile based on the incoming workload data;
    analyzing the workload data to forecast changes in power associated with the chip processing an upcoming workload; and
    in response to a forecasted change in power associated with the chip, implementing control measures,
    wherein a set of core processors is identified and workload is kept constant and is distributed such that each processor chips has its utilization and temperature maintained for approximately the same amount of time.

13. The method of claim 12, wherein implementing control measures comprises:
    communicating the forecasted changes to a cooling system; and
    changing, by the cooling system, the amount of cooling, in advance of any actual temperature shift to maintain a more constant microelectronic temperature.

14. The method of claim 12, wherein implementing control measures comprises scheduling the workload of the chip to reduce temperature fluctuation in response to a forecasted substantial heat load increase.

15. The method of claim 12, wherein an automated scheduling product regulates the introduction of work into the system to reduce at least one variable from the group consisting of a fluctuation in temperature, a rate at which temperature changes, or the range within which temperature fluctuates.

* * * * *